United States Patent
Early et al.

[15] 3,685,139
[45] Aug. 22, 1972

[54] METHOD OF BRAZING

[72] Inventors: James R. Early, Hawthorne; William M. Eyring, Redondo Beach; Donald W. McGrath, Torrance; Toshio Takenaka, Los Angeles, all of Calif.

[73] Assignee: The Garrett Corporation, Los Angeles, Calif.

[22] Filed: March 10, 1969

[21] Appl. No.: 805,562

[52] U.S. Cl. .................25/498, 29/494, 148/16.7, 263/2
[51] Int. Cl. ....................B23k 31/02, B23k 35/24
[58] Field of Search ....29/498, 494; 263/2; 148/16.6, 148/16.7

[56] References Cited

UNITED STATES PATENTS

| | | | |
|---|---|---|---|
| 2,095,807 | 10/1937 | Gier, Jr. | 29/494 X |
| 2,175,922 | 10/1939 | Scott | 148/16.7 X |
| 2,650,420 | 9/1953 | True | 263/2 X |
| 3,011,254 | 12/1961 | Melill et al. | 29/494 X |
| 3,136,032 | 6/1964 | Berndsen | 29/498 X |

*Primary Examiner*—John F. Campbell
*Assistant Examiner*—Ronald J. Shore
*Attorney*—Albert J. Miller and John N. Hazelwood

[57] ABSTRACT

The brazing of materials by means of a flow of heated gas.

11 Claims, 6 Drawing Figures

INVENTORS.
JAMES R. EARLY
WILLIAM M. EYRING
DONALD W. McGRATH
TOSHIO TAKENAKA

BY

ATTORNEY

METHOD OF BRAZING

BACKGROUND OF THE INVENTION

In brazing operations, a brazing filler metal, usually in the form of sheet, strip, wire, cladding, powder or the like is introduced between members of an assembly to be brazed. The brazing filler metal must be selected to have a melting point lower than any of the members to be joined and thus can melt and flow at temperatures below that which would detrimentally affect the material of the members to be joined. To obtain a sound braze joint, it is necessary that the molten brazing filler metal must wet the surface of the members to be joined. Accordingly, it may be necessary, with some materials which form an oxide coating in air which is difficult to remove, to utilize a flux to remove such an oxide.

The most commonly utilized methods of brazing materials are: torch brazing, in which heat is applied by means of a torch or other open flame; furnace brazing, in which the members to be joined are heated in air, vacuum, or non-oxidizing gases in a furnace; and dip brazing in which the assembled members are immersed in a molten salt bath. While each of these methods is capable of producing satisfactory results in certain situations, each has several inherent problems. Torch brazing is obviously limited to a single braze joint or a series of individual braze joints. Furnace brazing, while having widespread application cannot consistently achieve sufficiently uniform temperature distribution even with a circulating atmosphere within the furnace. Dip brazing introduces the problem of removal of the highly corrosive salt from the brazed assembly. Each of these problems or limitations is compounded by the present trend toward the brazing of denser more complex assemblies, thin gage materials, smaller tubular members, and the like.

SUMMARY OF THE INVENTION

The present invention discloses a novel method of and apparatus for brazing which utilizes the flow of a heated gas to accomplish the brazing of an assembly. Forced convection brazing, as the process of the present invention has been designated, involves heating a brazing gas and then passing the heated gas through a brazing chamber containing the assembly to be brazed. A pressure differential is created across the brazing chamber in order to establish this flow of heated gas through the brazing chamber. Conventional heating and gas pumping apparatus can be utilized.

To conserve the gas and provide greater purification, closed loop forced convection brazing can be accomplished by cycling the exhaust from the brazing chamber to the inlet of the pumping means. Various by-passes and controls along with other elements to conserve heat energy can be added to the closed loop to assist in start-up of the loop and to promote cycle operation and efficiency.

DETAILED DESCRIPTION OF INVENTION

Figure 1:
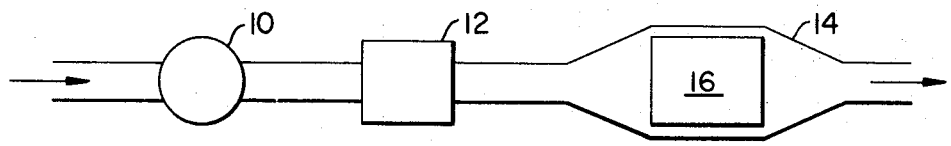
FIG. 1 is a schematic flow diagram of a forced convection brazing cycle.

As shown in FIG. 1, the basic forced convection brazing cycle of the present invention comprises a pressurizer 10, a heater 12, and a brazing chamber 14. The material to be brazed, such as a heat exchanger core assembly 16, is enclosed within the brazing chamber 14.

The pressurizer 10 such as a conventional pump or compressor receives a flow of a gaseous fluid and raises its pressure to a level sufficient to cause its flow through the remainder of the braze cycle. The noble gases, such as helium, neon, argon, krypton, and xenon are suitable inert or non-oxidizing gases available for this brazing cycle. Other non-oxidizing gases such as hydrogen, or nitrogen can be utilized in many circumstances. Also, there will be situations where a reactive gas such as chlorine, either alone or in combination with a suitable non-oxidizing gas, may be desirable.

After being raised in pressure, the pressurized gas can be heated to a brazing temperature in any conventional manner. For example, the heater 12 may include resistance heated elements, elements heated by induction coils or quartz lamps, or other equivalent means. The gas may likewise be indirectly heated by passing it through a heat exchanger.

The flow of the heated, pressurized gas through the assembly 16 in the brazing chamber 14 will accomplish the brazing of the assembly 16. After passing through the assembly 16, the gas is exhausted from the brazing chamber 14.

While the flow of gas is maintained in FIG. 1 by a pressurizer 10, it can also readily be maintained by a suction device such as a jet pump on the opposite side of the brazing chamber 14. To maintain flow, it is only important that the pressure at the inlet end of the brazing chamber 14 be greater than the pressure at the outlet end. This pressure differential can be accomplished by increasing pressure at the inlet end, decreasing pressure at the outlet end, or a combination of both of these.

Figure 2:
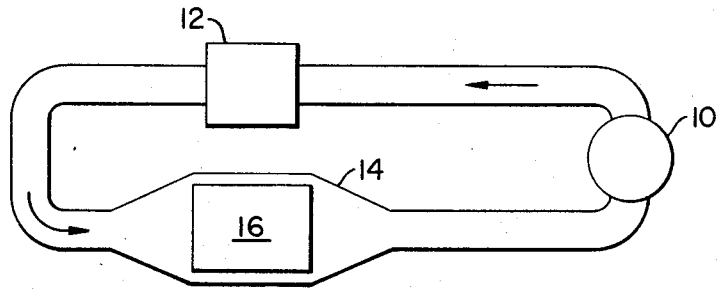
FIG. 2 is a schematic flow diagram of a closed loop forced convection brazing cycle.

To provide for the more efficient utilization of heat and gas, forced convection brazing can be accomplished in a closed loop as illustrated in FIG. 2. The loop is closed by connecting the exhaust of the brazing chamber 14 to the inlet of the pressurizer 10.

Figure 3:
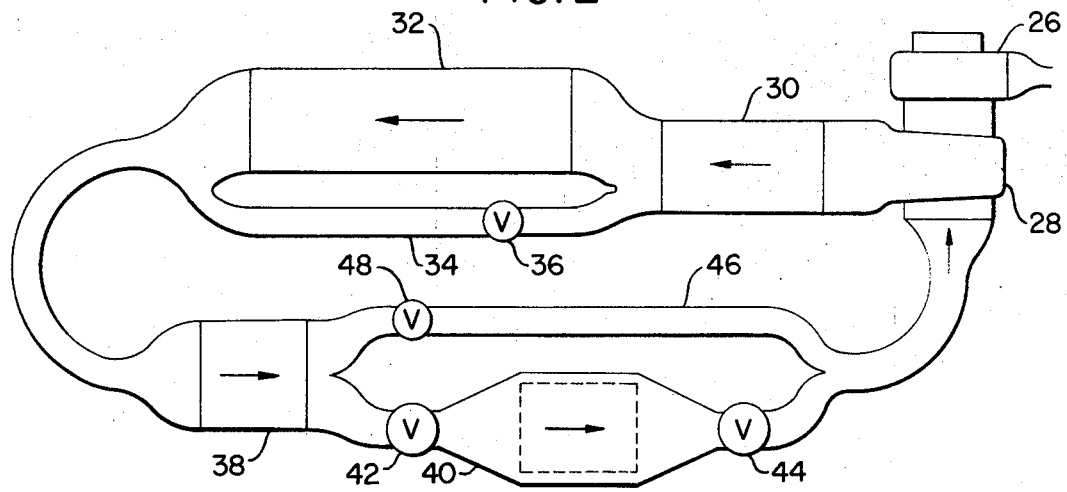
FIG. 3 is a schematic flow diagram of an alternate embodiment of a closed loop forced convection brazing cycle.

The closed loop for forced convection brazing can be modified as indicated in FIG. 3. A compressor 28, driven by a motor or turbine 26 provides pressurization for the brazing gas which is raised above the brazing temperature in heater 30. A purifier 32 receives the heated gas and serves to remove impurities and other undesirable constituents from the brazing gas. Depending upon the nature of the brazing gas, chips or sponge of titanium, copper, or molecular sieve reactive or sorptive materials or combinations thereof can be utilized in the purifier to remove such undesirable brazing gas constituents as oxygen, water vapor, residual solvents, oil vapor, etc. A purifier by-pass line 34 having a valve 36 provides a by-pass for the brazing gas around the purifier 32.

A cooler 38 such as a heat exchanger receives the purified, heated brazing gas and reduces its temperature to the desired brazing temperature before the gas is admitted to the brazing chamber 40. Valves 42 and 44 control the inlet and outlet, respectively, of the brazing chamber 40. A brazing chamber by-pass line 46 including a valve 48 permits flow around the brazing chamber 40.

Figure 4:
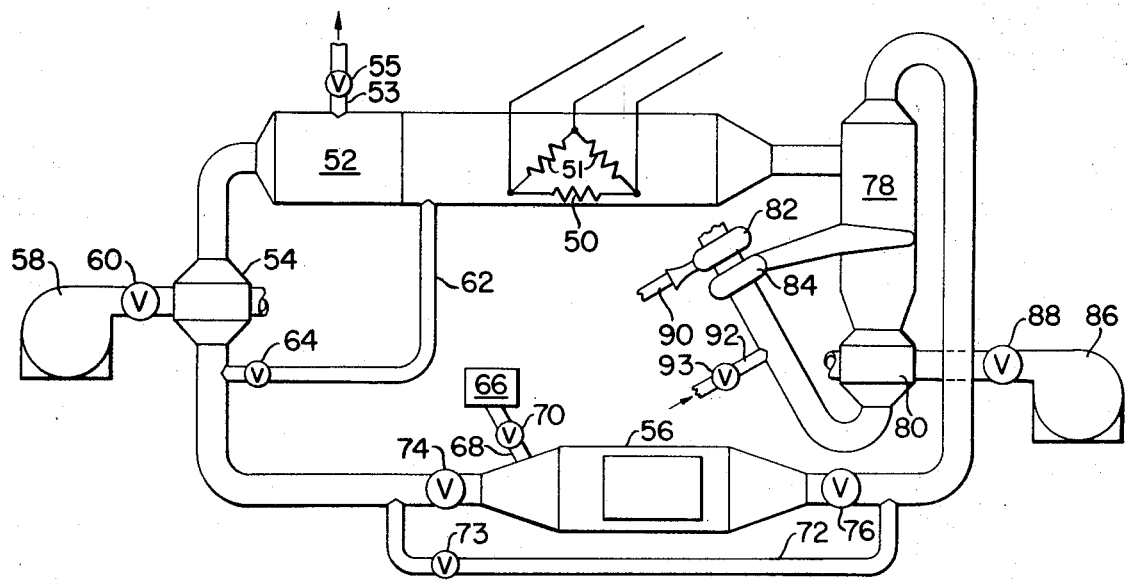
FIG. 4 is a schematic flow diagram of another alternate embodiment of a closed loop forced convection brazing cycle.

A further embodiment of the closed loop is illustrated in FIG. 4. The loop includes a heater 50 having a heat source such as tungsten carbide electrical resistance elements 51 for heating the brazing gas, a purifier 52 to remove impurities and water vapor from the heated brazing gas, and a cooler 54 to control the temperature of the brazing gas before it enters the brazing chamber 56. The cooler 54 may include an air blower 58 having its flow controlled by valve 60. A by-pass line 62 having valve 64 provides a by-pass around the purifier 52 and cooler 54 to permit a fast introduction of heated brazing gas to the brazing chamber 56. Also the purifier 52 may be provided with a vent 53 including a valve 55.

A vacuum pump 66 is connected to the brazing chamber 56 by line 68 having valve 70. A brazing chamber by-pass 72 having valve 73 permits a by-pass of the brazing chamber 56. Valves 74 and 76 are positioned at the inlet and outlet, respectively, of the brazing chamber 56. After passing through the brazing chamber 56, the brazing gas passes through a recuperator 78 and heat sink 80, turbine 82 driven compressor 84, and back through the opposite side of the recuperator 78 before returning to the heater 50. An air blower 86 with its flow controlled by valve 88 can provide the cooling air for heat sink 80. A compressed air line 90 from a source of compressed air (not shown) will provide motive power for the turbine 82. Make up brazing gas can be added to the loop through the make up line 92 having valve 93.

In operation, once the assembly to be brazed is positioned within the brazing chamber 56, the closed loop with all valves open is first evacuated by means of the vacuum pump 66. The loop is then purged with argon or some other brazing gas introduced through line 92 and vented through vent 53. The turbine 82 is then started to drive the compressor 84 and the vent 53 is closed by valve 55. Valve 64 is then closed in the by-pass 62 and the heater 50 is turned on to heat the argon. When the argon temperature at the brazing chamber 56 has reached an intermediate value, say 400° F, the valves 74 and 76 are closed. The temperature will continue to rise in the loop until the temperature at the brazing chamber by-pass reaches the brazing temperature, for example, 1100° F. The cooler 54 is then utilized to bring the argon temperature back down to the intermediate value of 400° F by turning on blower 58 with valve 60 open.

At this point, brazing chamber by-pass valve 73 is closed and valves 74 and 76 opened. By controlling the blower valve 60 and the blower 58, the temperature at the brazing chamber can be raised to and stabilized at the brazing temperature of 1100° F for the period of time required for brazing. Once brazing has been accomplished, the loop can be cooled by turning off the heater 50, opening blower valve 60 to its maximum and opening all loop valves.

The recuperator 78 and heat sink 80 are provided to decrease the argon temperature to an acceptable temperature before compression in the compressor 84. The argon will recover a portion of this heat during the compression process and in passing through the other side of the recuperator 78 before entering the heater 50.

Forced convection brazing, either open or closed loop is generally applicable to all brazing materials. It is, however, especially suited to the fluxless brazing of aluminum and its alloys, stainless steel or superalloy heat exchanger cores.

Figure 5:
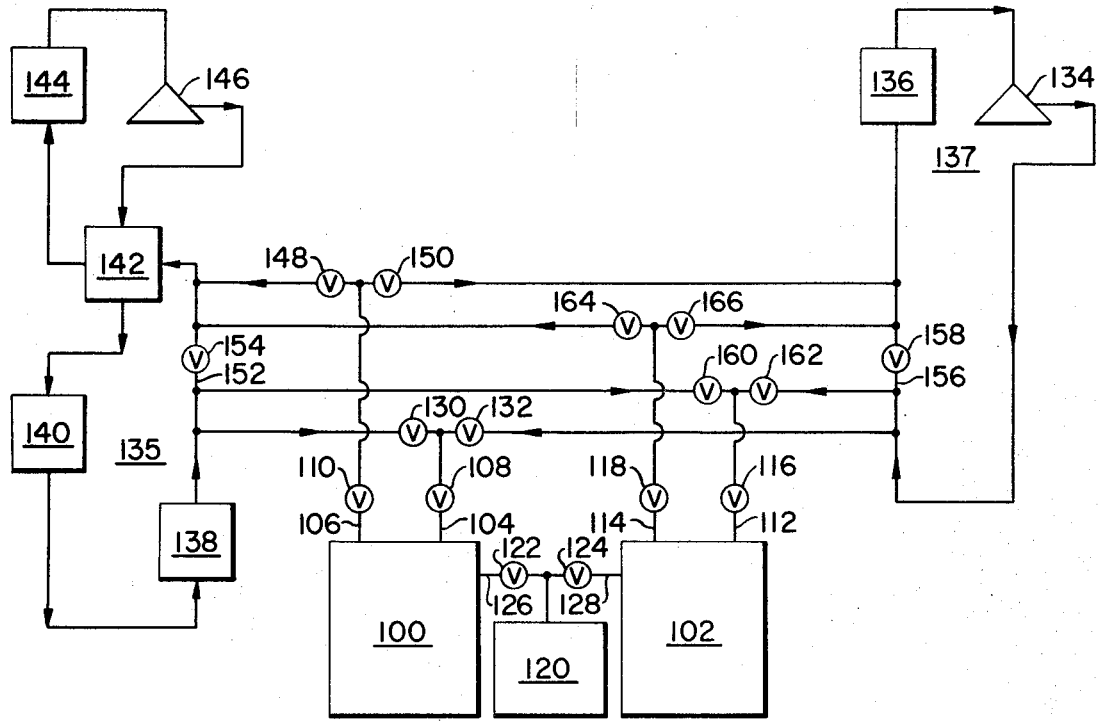
FIG. 5 is a schematic flow diagram of yet another alternate embodiment of a closed loop forced convection brazing cycle.

A forced convection brazing cycle specifically designed for the brazing of aluminum heat exchanger cores is shown in FIG. 5. As indicated, there are two brazing chambers 100 and 102 in this cycle. The inlet 104 and outlet 106 of brazing chamber 100 are controlled by open or shut valves 108 and 110, respectively; likewise, the inlet 112 and outlet 114 of brazing chamber 102 are controlled by inlet valve 116 and outlet valve 118. Vacuum pump 120 is connected to both chambers 100 and 102 by means of lines 126 and 128, respectively. Open/close valves 122 and 124, respectively, control access to the chambers in these lines. The inlet of the brazing chamber 100 receives a flow of hot gas from a hot loop 135 controlled by adjustable valve 130 and a flow of cold gas from a cold loop 137 controlled by adjustable valve 132. The cold loop comprises a compressor 134 and cooler 136.

The flow of hot gas through valve 130 is received from the hot loop which comprises a titanium chip filter 138, heater 140, recuperator 142, cooler 144 and compressor 146. The outlet of brazing chamber 100 can exhaust gases to either the recuperator 142 or cooler 136. Control of gas to the recuperator 142 is maintained by valve 148 while control of gas to the cooler 136 is maintained by valve 150. Exhaust gases received by the recuperator are passed through the recuperator 142 to the cooler 144, and then to the compressor 146 and are then passed through the other side of the recuperator 142. These gases are heated in the heater 140 and purified in the filter 138 before proceeding to the inlet 104 of the brazing chamber 100. A by-pass line 152 from the filter 138 to the recuperator 142 is controlled by valve 154. A second by-pass line 156 from the compressor 134 to the cooler 136 is controlled by valve 158.

Brazing chamber 102 is connected to the loop elements in a similar fashion to brazing chamber 100. Valves 160 and 162 control the flow of hot gas and cold gas to the inlet while valves 164 and 166 control the distribution of the outlet gas from the brazing chamber 102.

Operation of the closed loop of FIG. 5 is similar to operation of the FIG. 4 loop. Temperature control is achieved by mixing hot gas with cold gas in various proportions by the manipulation of the control valves.

Figure 6:
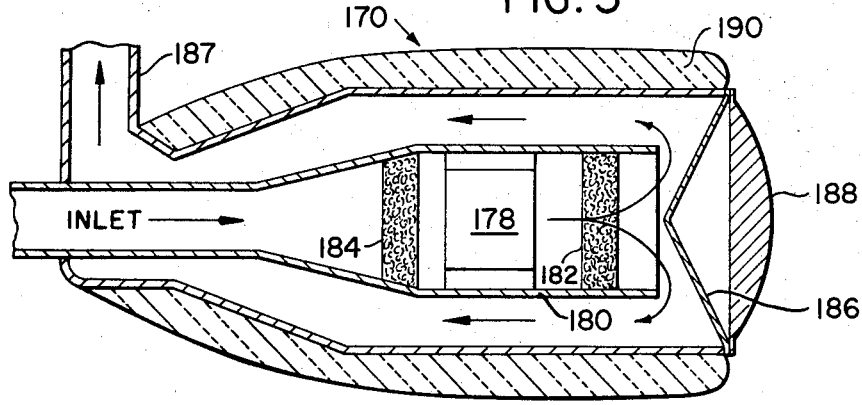
FIG. 6 is a cross-sectional view of a reverse flow brazing chamber.

In operation, the brazing chamber in any of the forced convection brazing cycle configurations may be constructed with a reverse flow. A reverse flow chamber 170, such as illustrated in FIG. 6, is utilized to obtain a more uniform temperature distribution across the assembly to be brazed. The assembly 178 such as a heat exchanger core is contained in an inner chamber 180. Heat reflecting chips 182 and 184 are positioned on either side of the assembly 178. A deflection plate 186 positioned at the outlet of the inner chamber 180 will direct the flow of the still heated gasses around the inner chamber 180 and then out the outlet 187. A door 188 provides access to the inner chamber 180. Insulation 190 is provided around the brazing chamber to facilitate maintenance of the uniform temperature.

It should be recognized that many modifications can be made to the brazing cycle without departing from the spirit and scope of the present invention. The selection of specific process components and parameters will be basically governed by the materials to be brazed. Many possible combinations of brazing fluids, brazing materials, and cycle parameters are possible.

What we claim is:

1. A method of brazing comprising the steps of:
heating a brazing gas to a brazing temperature at a first location;
purifying the brazing gas;
transferring the heated, purified, brazing temperature brazing gas to a brazing chamber at a second location situated apart from said first location where the brazing gas is heated, said brazing chamber without direct heating means; and
passing the heated brazing gas around and through, and in direct contact with the surfaces of, an assembly to be brazed in the brazing chamber at the second location to braze said assembly.

2. A method of brazing comprising the steps of:
pressurizing a brazing gas;
heating the pressurized brazing gas above a brazing temperature;
purifying the heated brazing gas;
cooling the purified brazing gas to a brazing temperature;
passing the brazing gas through an assembly to be brazed; and
cooling the brazing gas before it is pressurized to complete a substantially closed cycle.

3. A method brazing comprising the steps of:
circulating a brazing gas in a closed brazing gas loop;
heating the brazing gas in the closed brazing gas loop to a brazing temperature at a first location in the closed brazing gas loop;
purifying the heated brazing gas in the closed brazing gas loop; and
passing the heated, purified, brazing temperature, brazing gas in the closed brazing gas loop through and around, and in direct contact with the surfaces of, an assembly to be brazed enclosed within a brazing chamber at a second location in the closed brazing gas loop spaced apart from the first location in the closed brazing gas loop where the brazing gas is heated to braze said assembly, said brazing chamber having no direct heating means.

4. A method of brazing comprising the steps of:
pressurizing a brazing gas;
heating the pressurized brazing pas above a brazing temperature;
cooling the heated brazing gas to a brazing temperature; and
passing the brazing gas through an assembly to be brazed to braze said assembly.

5. The method of claim 4 and in addition cooling the brazing gas after it is passed through the assembly to be brazed and before it is pressurized to complete a substantially closed loop.

6. The method of brazing of claim 4 additionally including the step of purifying the brazing gas after the brazing gas is heated and before the brazing gas is cooled and passed through the assembly to be brazed.

7. A method of brazing comprising the steps of:
circulating a hot brazing gas above a brazing temperature in a closed hot brazing gas loop;
circulating a cold brazing gas in a closed cold brazing gas loop; and
mixing the hot brazing gas from the hot brazing gas loop with the cold brazing gas from the cold brazing gas loop in a brazing chamber enclosing an assembly to be brazed to produce a mixture of brazing gas at a brazing temperature in the brazing chamber to braze said assembly.

8. A method of brazing comprising:
circulating a brazing gas in a closed brazing gas loop having a brazing chamber therein;
heating the brazing gas in the closed brazing gas loop to a brazing temperature;
by-passing the brazing gas in the closed brazing gas loop around the brazing chamber in the closed brazing gas loop during the heating of the brazing gas; and
passing the heated, brazing temperature, brazing gas in the closed brazing gas loop through the brazing chamber to braze an assembly enclosed within the brazing chamber.

9. A method of brazing comprising: loop having
circulating a brazing gas in a closed brazing gas loop having a brazing chamber therein;
heating the brazing gas in the closed brazing gas loop above a brazing temperature;
cooling the heated brazing gas in the closed brazing gas loop to a brazing temperature; and
passing the heated, brazing temperature, brazing gas through the brazing chamber to braze an assembly enclosed within the brazing chamber.

10. The method of brazing of claim 9 additionally including purifying the brazing gas in the closed brazing gas loop after the brazing gas is heated and before the brazing gas is cooled.

11. The method of brazing comprising:
enclosing an assembly to be brazed in a brazing chamber;
circulating a hot brazing gas above a brazing temperature in a hot brazing gas loop to provide hot brazing gas above a brazing temperature to the brazing chamber;
circulating a cold brazing gas in a cold brazing gas loop to provide cold brazing gas to the brazing chamber; and
mixing the hot brazing gas and the cold brazing gas in the brazing chamber to produce brazing gas at a brazing temperature to braze the assembly enclosed in the brazing chamber.

* * * * *

UNITED STATES PATENT OFFICE
CERTIFICATE OF CORRECTION

Patent No. 3,685,139                Dated  August 22, 1972

Inventor(s)  James R. Early et al

It is certified that error appears in the above-identified patent and that said Letters Patent are hereby corrected as shown below:

Claim 4, line 3, change "pas" to --gas--

Claim 9, line 1, after "comprising:" delete "loop having"

Signed and sealed this 9th day of January 1973.

(SEAL)
Attest:

EDWARD M. FLETCHER, JR.                ROBERT GOTTSCHALK
Attesting Officer                      Commissioner of Patents